United States Patent
Arnold et al.

(10) Patent No.: US 7,022,970 B2
(45) Date of Patent: Apr. 4, 2006

(54) DEVICE AND METHOD FOR DETECTING AN OBJECT OR A PERSON IN THE PASSENGER COMPARTMENT OF A VEHICLE

(75) Inventors: Martin Arnold, Munich (DE); Thomas Stierle, Regensburg (DE)

(73) Assignee: Siemens Aktiengellschaft, Munich (DE)

( * ) Notice: Subject to any disclaimer, the term of this patent is extended or adjusted under 35 U.S.C. 154(b) by 302 days.

(21) Appl. No.: 10/239,920

(22) PCT Filed: Mar. 8, 2001

(86) PCT No.: PCT/DE01/00897

§ 371 (c)(1),
(2), (4) Date: Mar. 14, 2003

(87) PCT Pub. No.: WO01/72557

PCT Pub. Date: Oct. 4, 2001

(65) Prior Publication Data

US 2003/0160154 A1 Aug. 28, 2003

(30) Foreign Application Priority Data

Mar. 28, 2000 (DE) ................................ 100 15 274

(51) Int. Cl.
*H01J 40/14* (2006.01)
(52) U.S. Cl. ...................... 250/221; 250/205
(58) Field of Classification Search ............... 250/221, 250/222.1, 559.4, 214 AL, 214 R, 205, 214.1; 280/735, 748; 180/272
See application file for complete search history.

(56) References Cited

U.S. PATENT DOCUMENTS

| 4,683,373 | A |   | 7/1987  | Tupman        |         |
|-----------|---|---|---------|---------------|---------|
| 5,330,226 | A |   | 7/1994  | Gentry et al. |         |
| 5,451,765 | A | * | 9/1995  | Gerber        | 250/205 |
| 5,482,314 | A |   | 1/1996  | Corrado et al.|         |
| 5,541,695 | A |   | 7/1996  | Teremy et al. |         |
| 5,585,625 | A |   | 12/1996 | Spies         |         |
| 5,752,115 | A |   | 5/1998  | McIntyre et al.|        |
| 5,848,802 | A |   | 12/1998 | Breed et al.  |         |
| 6,452,288 | B1| * | 9/2002  | Roth et al.   | 307/10.1|

FOREIGN PATENT DOCUMENTS

| DE | 39 03 501 A1   | 8/1989  |
| DE | 197 41 393 A1  | 3/1998  |
| DE | 197 57 595 A1  | 7/1999  |
| EP | 0 669 227 B1   | 8/1995  |
| EP | 1 031 477 A1   | 8/2000  |
| WO | WO 94/23974    | 10/1994 |
| WO | WO 99/54173    | 10/1999 |

* cited by examiner

*Primary Examiner*—Que T. Le
(74) *Attorney, Agent, or Firm*—Morrison & Foerster LLP

(57) ABSTRACT

The invention relates to a device and a method for detecting an object or a person is received. The receiving power is permanently detected. The laser light pulse is switched off when a threshold value that matches sufficient receiving power is obtained.

9 Claims, 3 Drawing Sheets

DEVICE AND METHOD FOR DETECTING AN OBJECT OR A PERSON IN THE PASSENGER COMPARTMENT OF A VEHICLE

CLAIM FOR PRIORITY

This application claims priority to International Application No. PCT/DE01/00897 which was published in the German language on Oct. 4, 2001.

TECHNICAL FIELD OF THE INVENTION

The invention relates to a device and a method for detecting an object or a person in the passenger compartment of a vehicle.

BACKGROUND OF THE INVENTION

Persons located in a forward position toward the dashboard, in particular children, are exposed during the operation of a motor vehicle fitted with an airbag to the risk of suffering injury due to the force of inflation of the airbag in the event of an accident. Modern control systems for personal protection have sought to disconnect the airbag in such situations or to inflate it with less force, to prevent the risk of injury to an occupant. Contactless, optical sensors are preferably used to detect the position of the occupant in the vehicle.

A known device for contactless detection of an object or a person in the passenger compartment of a vehicle is known, for example, from U.S. Pat. No. 5,585,625 or EP 0 669 227. In these examples, the seat of the vehicle is exposed to radiation from a number of light diodes. Beams reflected by the vehicle seat or a person or an object on the vehicle seat are detected by a photodetector field.

The light source used in the optical detection system is preferably a laser, which allows precise scanning due to its monochrome radiation. Laser diodes, and in particular semiconductor laser diodes, are usually used as transmitters.

In order to prevent the laser imposing a sustained energy load on persons in the passenger compartment, the laser is pulsed. But even in this operating mode, the health of the occupant should under no circumstances be impaired as a result of the laser light pulses emitted.

SUMMARY OF THE INVENTION

The invention relates to a device and a method for detecting an object or a person in the passenger compartment of a vehicle, whereby the device has a laser for emitting laser light pulses and an optical receiver for laser light pulses reflected off the object or person. The method also involves as a minimum emission of a laser light pulse and receipt of a laser light pulse reflected off the person or object.

The invention seeks to take precautions, based on the known device and the known method for detecting an object or a person in the passenger compartment of a vehicle, both referred to above, which precautions allow the use of a laser without impairing the state of health of an occupant in a motor vehicle.

The invention has the advantage that both the short-term power and the total power over a long period are kept as low as possible, but reliable detection of the position of the occupant is still ensured.

In one embodiment of the invention, there is a device having a detection unit connected to the laser, which determines the receiving power and switches off the laser light pulse when a limit value corresponding to an adequate receiving power is reached.

In another embodiment according to the invention, there is a method in which there is a provision for remote detection and local detection on receipt of the laser light pulse, with the received signals for remote detection and local detection respectively being integrated and the sum of the two integrated received signals for remote detection and local detection being compared respectively with the limit value. The corresponding detection unit is linked to two optical sensors, one of which is used for remote detection and the other for local detection. The sensor signals are integrated using integration units, downstream from which a comparator stage is connected, which compares the sum of the output signals from the integration units with the limit value. Recording the total power, in other words the sum of the powers from local and remote detection, provides the quotient for determining distance in the form of a voltage and significantly simplifies the work involved in measurement and analysis for occupant identification. The result of the remote detection is read off for occupant identification and provides an immediate measure of the distance. Combined use of local and remote detection saves a significant amount of work. Also separate local and remote detection allows much more precise determination of total power.

Preferably each of the sensors include one photodiode operating in the non-conducting direction and, if required, two power sources connected in parallel to the photodiode, one of which emits a constant current and the other a pulsed constant current.

In another embodiment of the invention, the integration unit has a unit to compensate for ambient light. Suppressing the ambient light component makes both the measurement of power actually emitted and the measurement of distance much more accurate.

The unit to compensate for ambient light may have an integrator element, which integrates the output signal of the respective sensor minus a correction signal, subtracts a reference signal from this and integrates the resulting difference—representing a correction signal.

BRIEF DESCRIPTION OF THE DRAWINGS

The invention is described in more detail below using the embodiments shown in the figures in the drawings. These show.

DETAILED DESCRIPTION OF THE PREFERRED EMBODIMENTS

Figure 1:
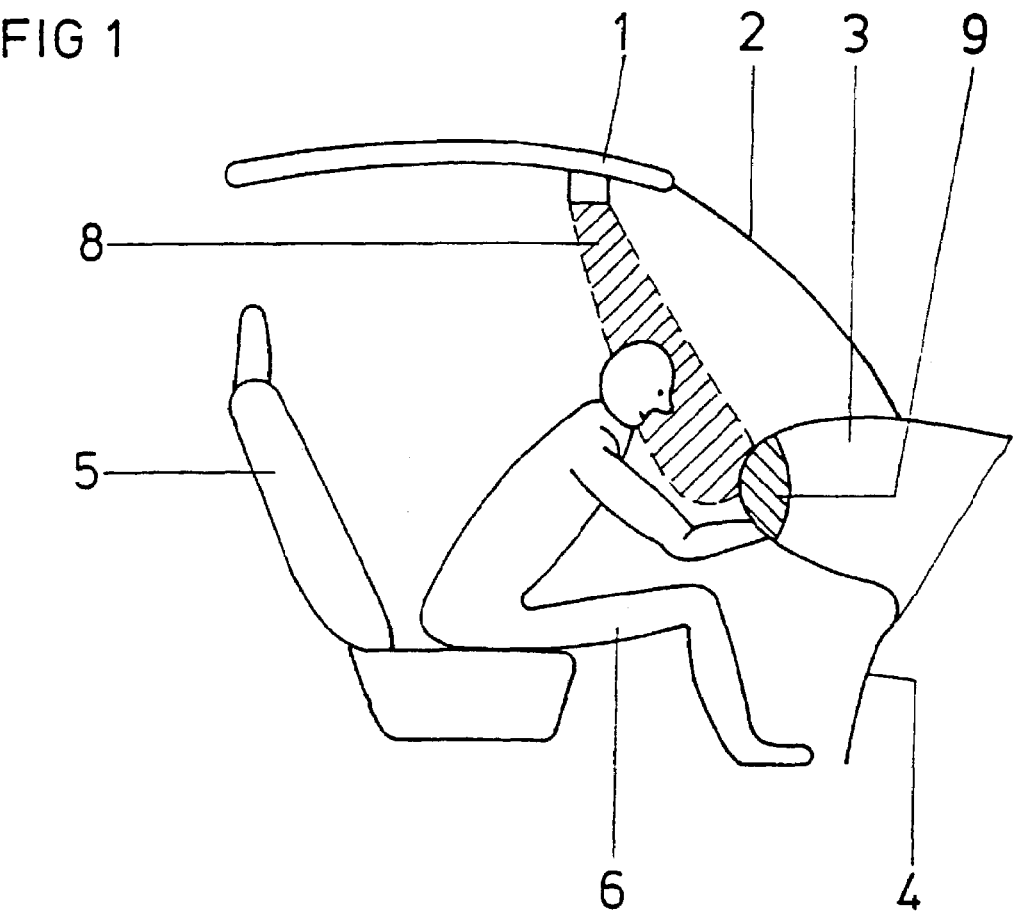
FIG. 1 a cross-section of a passenger cell.

FIG. 1 shows a cross-section of a front, passenger-side passenger cell. The passenger compartment here is defined by a roof 1, a windshield 2, a dashboard 3 and a footwell 4.

However the roof 1, resulting in a closed passenger cell, does not necessarily have to be present to define the passenger compartment. A vehicle seat 5 is also shown, on which a person 6 is sitting in a position with the upper body forwards. A device 7 for detecting an object or a person is located on the roof 1. This unit has the area of coverage 8, as shown. The dashboard 3 includes a passenger airbag module 9 in the folded state. In the unfolded state, the passenger airbag shoots toward the head of the person 6. With the device 7, the area of risk in the direction of inflation in front of the folded airbag module is monitored. If an occupant or a child seat is detected in the area of coverage 8, activation of the airbag module 9 is prevented or measured out appropriately. The device 7 may, however, also be directed at the driver's seat 5 to detect movement of a person from the normal sitting position. Devices are also conceivable which scan the entire front vehicle compartment with a plurality of sensors and can record any type of position of an object or person. The invention is therefore not restricted to the specific detection of an image of an object or a person, but is also used in particular to monitor a specific area or a specific zone in the passenger compartment for the presence of an object or a person. The unit is designed for contactless detection.

The sensor in the device 7 scans its area of coverage 8 by means of optical radiation, for example infrared radiation. Other radiations with different wavelengths may also be used. The sensor includes a light diode, for example, an infrared transmitter in the form of a laser diode, which emits one or more beams or beam curtains. The sensor also includes one or more optical receiver elements in the form of photocells, which record the scattered radiation reflected off an object or a person.

The distance between the sensor and the object and, if required, the contouring and precise position definition in the two or three-dimensional space can be determined by analysis of the scattered radiation. Preferably the sensor covers a plurality of beam curtains one behind the other in the vertical plane in the direction of travel and includes a plurality of receiver elements for each beam curtain in respect of the transverse axis of the vehicle. This ensures three-dimensional person or object identification, as each receiver element supplies a data unit of two-dimensional significance and the third, vertical dimension is obtained through an analysis of the strength, power or energy content of reflected radiation. A suitable unit with simple technical tools, for example, just has a light barrier scanning the unfolding space of the airbag. The position of an object or person is preferably determined using the delay time measurement or triangulation method.

Figure 2:
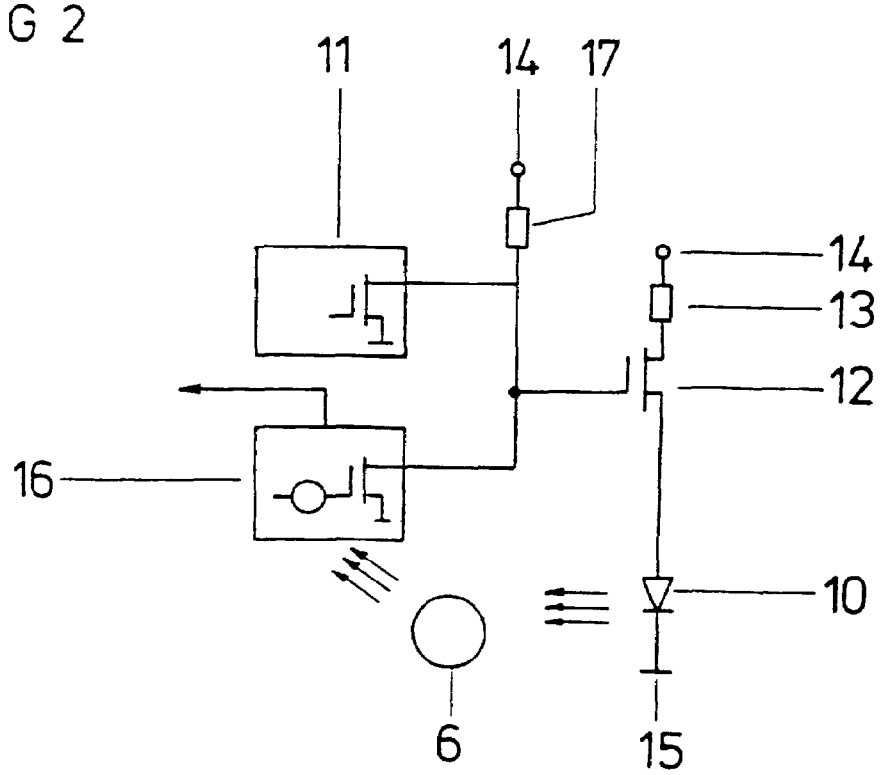
FIG. 2 a block circuit diagram of a device according to the invention.

FIG. 2 shows a block circuit diagram of a device according to the invention with a laser 10 for emitting laser light pulses. A control unit 11 operates the laser 10 by means of a transistor 12 in pulse operation and thereby limits the maximum power which can be emitted by the laser 10. For this purpose the control input of the transistor 12 is connected to the output of the control unit 11 and its controlled section is connected in series to the laser 10 and in series to a resistance 13 to limit the current between the poles 14, 15 of a current supply unit (not shown in more precise detail). A detection unit 16 receives the light from the laser 10 scattered by the person 6 and uses this to determine the receiving power continuously, switching off the laser 10 via the transistor 12 when a limit value corresponding to adequate receiving power is reached. The control unit 11 and the detection unit 16 respectively have an open collector output for this purpose, which are both linked to one another and are connected across a resistance 17 to the one pole 14 of the current supply unit. In this way the outputs of the control unit 11 and the detection unit are ANDed to each other. The control unit 11 therefore defines a fixed scan ratio, which in turn determines the maximum power of the laser 10. However the pulse can be shortened by means of the detection unit 16, thereby reducing the power to the minimum required rate.

Figure 3:
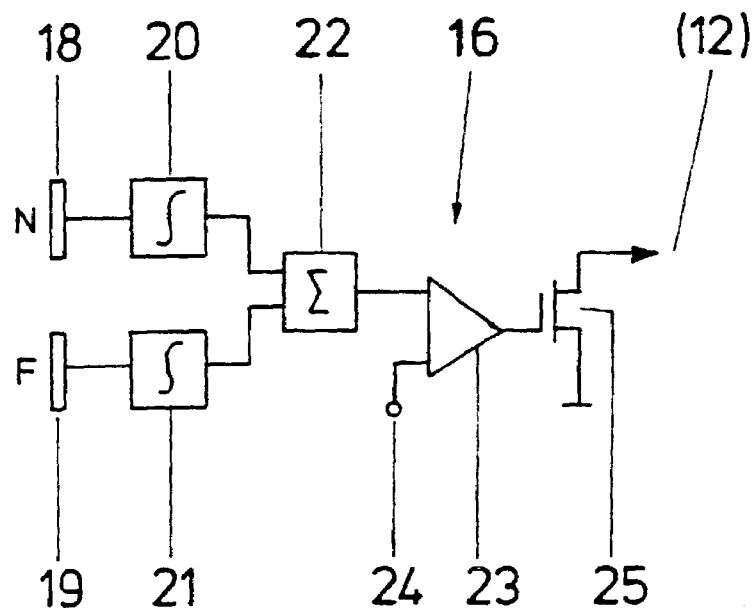
FIG. 3 a control unit with two optical sensors for local and remote detection in a device according to the invention.

FIG. 3 shows a possible embodiment of a detection unit 16 according to FIG. 2. The embodiment shown includes two optical sensors 18 and 19, one of which 18 is used for local detection and the other 19 for remote detection. Each optical sensor 18, 19 is followed by an integration stage 20 or 21, downstream from which a joint addition stage 22 is connected. The output of the addition stage 22 is linked to a comparator stage 23, to which a limit value signal 24 is also applied. The comparator stage 23 then controls a transistor 25, which in turn forms an open collector output connected to the gate terminal of the transistor 12 (not shown in FIG. 3). This means that there is provision for both remote detection and local detection at the detection unit 16. The received signals for remote detection and local detection are then integrated respectively and the sum of the two received signals integrated respectively for remote detection and local detection are compared with a limit value given by the limit value signal 24. The limit value characterizes an adequate receiving power, in other words a power which is adequate to detect an object or a person in the passenger compartment of the vehicle.

Figure 4:
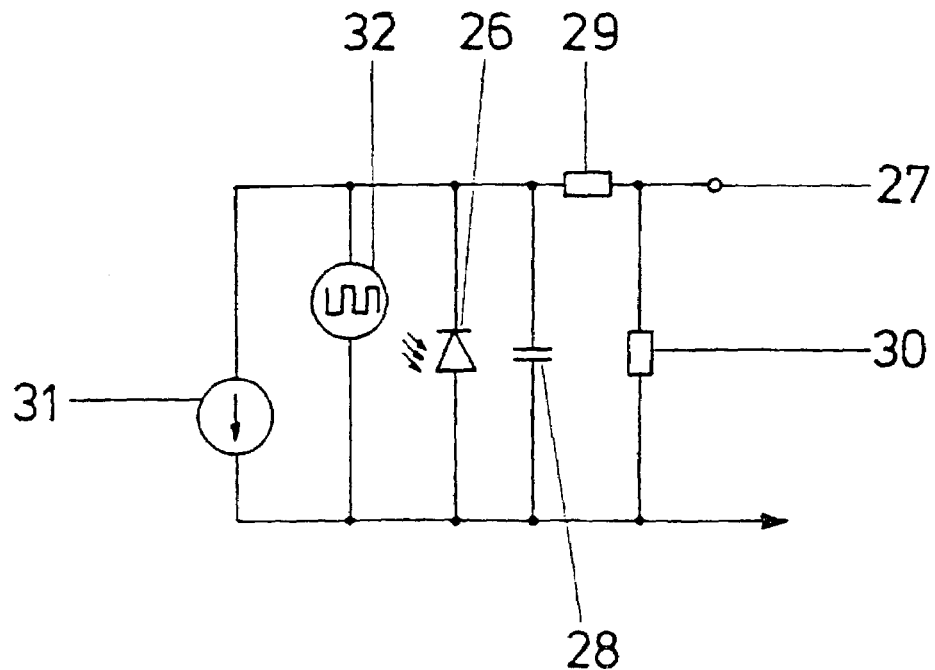
FIG. 4 an optical sensor in a device according to the invention.

According to FIG. 4, a preferred optical sensor includes a photodiode 26, which is fed by a voltage supply unit 27 not shown in more detail and thereby operated in the non-conducting direction. A capacitor 28 is connected in parallel to the photodiode and a resistance 29 is then connected in series to these two. A resistance 30 is also connected in parallel to the series circuit comprising the resistance 29 and photodiode 26 or capacitor 28. Finally a constant current injection 31 and a pulsed current injection 32 are connected in parallel to the photodiode.

Figure 5:
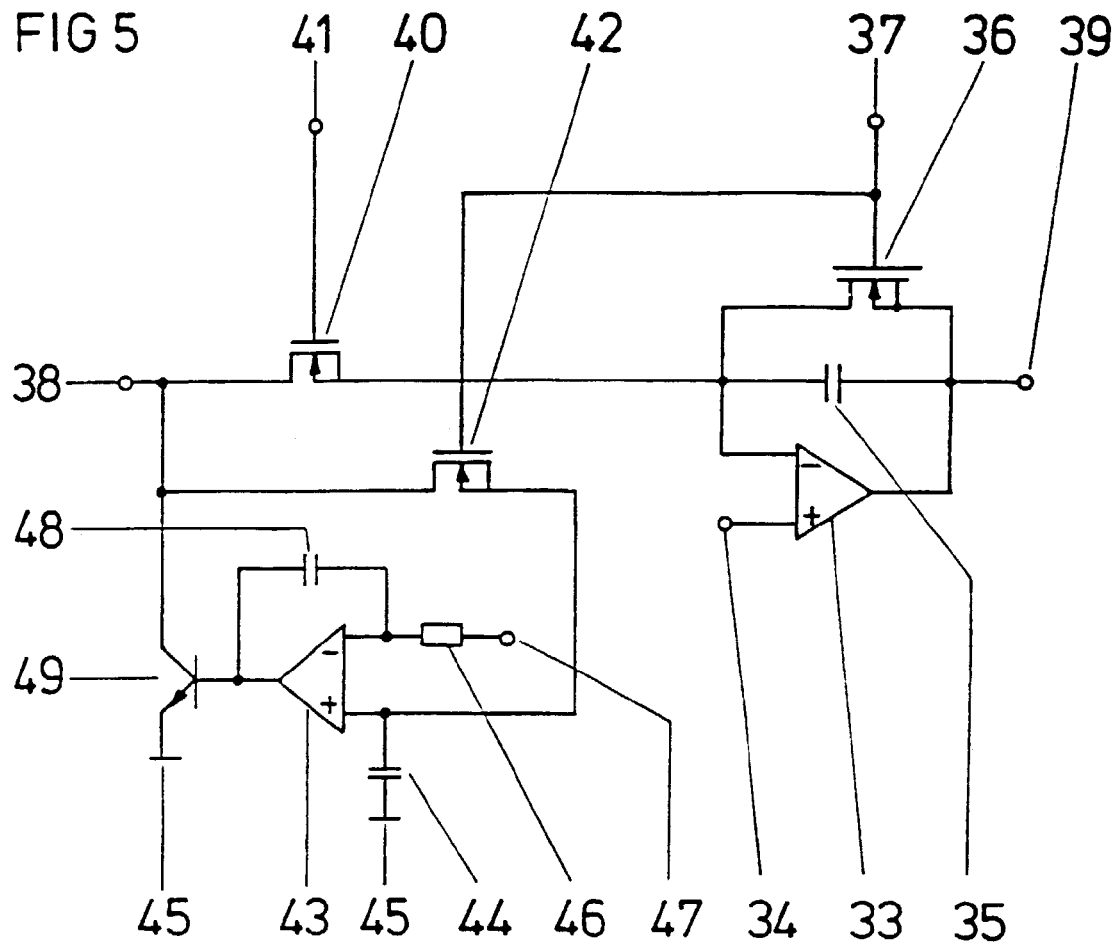
FIG. 5 an integration unit in a device according to the invention.

The integration units preferably include a unit to compensate for ambient light. Such an integration stage is shown in FIG. 5. This includes an operational amplifier 33, the non-inverting input of which is connected to a reference potential 34 and the inverting input of which is linked with an intermediate capacitor 35 to its output, which forms the output of the integration stage. The controlled section of a transistor 36 is connected in parallel to the capacitor 36 and this transistor is controlled by a reset signal 37 and used to discharge the capacitor 35 and thereby to reset the entire integration stage. The inverting input of the operational amplifier is also subject, with an intermediate connection to the controlled section of a transistor 40, to an input signal 38 supplied by the respective optical sensor, with the transistor being controlled by a set signal 41. The transistor 40 is controlled such that, when the set signal 41 occurs, the input signal is sent to the inverting input of the operational amplifier 33. The input signal 38 is also applied, with an intermediate connection to the controlled section of a transistor 42 controlled by the reset signal 37, to the inverting input of an operational amplifier 43. The non-inverting input of the operational amplifier 43 is also linked via a capacitor 44 to a reference potential 45. The inverting input of the operational amplifier 43 is on the one hand connected via a resistance 46 to a reference potential 47 and on the other hand via a capacitor 48 to its output. The output of the operational amplifier 43 then controls a transistor 49, the controlled section of which is connected between the reference potential 45 and the node point supplying the input signal 38.

Figure 6:
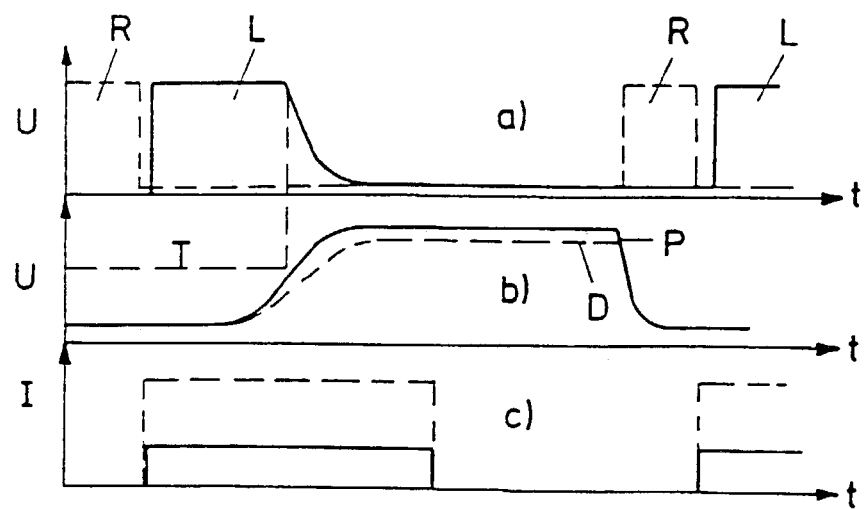
FIG. 6 the signal pattern for a method according to the invention.

FIG. 6 shows the pattern of different signals as voltage U or as current I over time t. Diagram (a) first shows the pattern of a reset signal R. After the occurrence of the almost rectangular pulse of the reset signal R, a laser control signal L is generated, which activates the laser. A reset operation takes place, repeated at specific time intervals, followed by repeat activation of the laser. Laser switch off, by the negative side of the laser control signal L, takes place when the total receiving power P, obtained from the sum of the powers for local and remote detection, exceeds a limit value T. The limit value T indicates the minimum power required for detection. The total power P and the power determined for remote detection can then be used to determine the distance D in the steady state during a pulse. Diagram c shows what happens without power limitation according to the invention. Two pulses N and F (for the remote and local detection lasers respectively) with a specific constant defining the maximum power are emitted, the amplitudes of which however have different amplitudes corresponding to the respective use (local and remote detection). As can be seen, according to the invention the pulse is terminated earlier than is defined by the maximum pulse duration.

The distance measurement may for example be based on what is known as the triangulation method. Here the object to be measured is subjected to linear illumination with a laser, for example a semiconductor laser. This "laser stripe" is formed with a lens on two photodiodes. As the emitting laser and the observing lens are at an angle to each other, the image of the laser stripe moves over the two photodiodes, when the distance between the object to be measured and the sensor arrangement changes. The two photodiodes may be arranged in a triangle and offset in respect of each other. One of the two diodes is used for local detection, the other for remote detection. As both photodiodes are also arranged in opposite directions, there is a different photocurrent in the two diodes, depending on the position of the laser stripe. The object distance D is therefore proportional to the difference between the photocurrent n for local detection and the photocurrent f for remote detection. In order to be independent of the remission characteristics of the observed object, the sum of the two signals is normalized. A is a proportionality constant for converting the normalized difference to the distance. This means that:

$$D = A \cdot (n-f)/(n+f)$$

The measurement of distance can be further simplified by having the element for local detection or the element for remote detection in the numerator and leaving out the subtraction. The resulting equation with a different proportionality constant B is then:

$$D = B_f \cdot f/(n+f)$$

or $$D = B_n \cdot n/(n+f)$$

If the addition, subtraction and division of the signals are to be digital, which is generally the case with modern arrangements, the dynamic of the analog/digital converter used to convert the two photocurrents is very high, in order to deal with the different remission factors of different objects. In particular, the required specifications for previous analog circuits are very stringent with regard to signal-to-noise ratio. In order to achieve a reasonable dynamic, up to now the laser power was adjusted by the microcontroller by means of pulse length. It is, however, evident that a number of laser pulses often have to be emitted to obtain a valid measured value. Additionally, the very calculation-intensive division (e.g. 16 bit) should be pointed out, as this excludes the use of small and low-cost microcontrollers.

Instead of directly controlling the length of the laser pulse, with the present invention the controller, for example, gives the release signal to an external circuit to generate the pulse, after it has set the input integrators to zero using two analog switches for example. The laser is activated on receipt of the release signal and the integrators start to measure the intensity of the remitted light via the two photocurrents. The two output signals of the local and remote detection elements are then added together by means of an addition unit and fed to a comparator. Once the threshold value set at the comparator is exceeded, the laser is switched off and at the same time the connection between the photodiodes and the associated integrators is broken by means of analog switches. In this way, the impact of external light is minimized, as the integrators operate for as long as the laser illuminates the object.

As the value of the comparison threshold is known, the sum of the signal intensity for local and remote detection in the denominator of the above equation can be divided to form (1) or can be included in the proportionality constant A. Division is then not required and lower-cost controllers can be used. Determination of distance requires measurement of the signal intensity for local and remote detection, as well as subtraction.

If, as mentioned above, local or remote detection is used, the work to be done by the microcontroller is reduced to determining a single measured value. A number of pulses without any significant result are no longer required when the measurement process is changed in this way, thus increasing measurement speed and radiation emission.

The invention may be developed so that the final switch-off is based on the length of the release signal, thus preventing the laser from unlimited emission, if the comparison threshold is not reached due to a fault or too low a remission level.

The invention claimed is:

1. A device for detecting an object or person in a passenger compartment of a vehicle, comprising:
    a laser to emit laser light pulses;
    an optical receiver or sensor to receive laser light pulses reflected off the object or the person; and
    a detection unit connected to the laser, which detects the receiving power continuously and switches off the laser light pulse when a limit value corresponding to an adequate receiving power is reached.

2. The device according to claim 1, wherein the detection unit is linked to two optical sensors, one of the optical sensors configured for remote detection and the other of the optical sensors configured for local detection,
    each of the optical sensors is followed by at least one integration unit and a comparator stage is connected downstream of the integrators, wherein the comparator stage compares the sum of the output signals of the at least one integration unit with the limit value.

3. The device according to claim 1, wherein the sensors have at least one photodiode.

4. The device according to claim 2, wherein the integration unit has a device to compensate for ambient light.

5. The device according to claim 4, wherein the unit to compensate for ambient light has an integrator element, which integrates the output signal of a respective sensor minus a correction signal.

6. A method for detecting an object or a person in a passenger compartment of a vehicle, comprising:
emitting at least one laser light pulse;
receiving the laser light pulse reflected off an object or a person; and
detecting a receiving power continuously and the laser light pulse is switched off when a limit value corresponding to an adequate receiving power is reached.

7. The method according to a claim 6, wherein there is provision for remote detection or local detection at a point of receipt of the laser light pulse, the received signals for remote detection and local detection respectively are integrated and a sum of the two respectively integrated received signals for remote detection and local detection is compared with a limit value.

8. The device according to claim 2, wherein the sensors have at least one photodiode.

9. The device according to claim 3, wherein the integration unit has a device to compensate for ambient light.

* * * * *